United States Patent [19]

Sterzel

[11] Patent Number: 4,879,065

[45] Date of Patent: Nov. 7, 1989

[54] PROCESSES OF MAKING PLASTICS MIXTURES WHICH ABSORB ELECTROMAGNETIC RADIATION AND CONTAIN FERROELECTRIC AND/OR PIEZOELECTRIC SUBSTANCES

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 120,707

[22] Filed: Nov. 13, 1987

Related U.S. Application Data

[63] Continuation of Ser. No. 28,547, Mar. 20, 1987, abandoned.

[30] Foreign Application Priority Data

Mar. 22, 1986 [DE] Fed. Rep. of Germany ....... 3609814

[51] Int. Cl.$^4$ .................... G03C 1/03; H01B 1/06; G21F 1/10
[52] U.S. Cl. .................... 252/600; 523/137; 501/12; 252/510; 252/511; 252/62.53; 252/62.9; 252/518; 252/520
[58] Field of Search .................... 523/137; 501/12; 252/62.53, 62.9, 478, 600, 510, 511, 518, 520

[56] References Cited

U.S. PATENT DOCUMENTS

| | | | |
|---|---|---|---|
| 4,023,174 | 5/1977 | Wright. | |
| 4,024,318 | 5/1977 | Forster et al. | 428/519 |
| 4,474,676 | 10/1984 | Ishina et al. | 252/62.53 X |
| 4,555,422 | 11/1985 | Nakamura et al. | 428/36 |
| 4,584,280 | 4/1986 | Nanao et al. | 501/12 |
| 4,604,303 | 8/1986 | Takakura et al. | 427/229 |
| 4,664,971 | 5/1987 | Soens | 252/510 X |
| 4,666,742 | 5/1987 | Takakura et al. | 427/229 |

FOREIGN PATENT DOCUMENTS

| | | | |
|---|---|---|---|
| 54-127000 | 10/1979 | Japan | 523/137 |
| 57-65751 | 4/1982 | Japan | 523/137 |
| 57-65754 | 4/1982 | Japan | 523/137 |
| 61-115937 | 6/1986 | Japan | 523/137 |
| 61-123199 | 6/1986 | Japan | 523/137 |
| 61-152766 | 7/1986 | Japan | 523/137 |

OTHER PUBLICATIONS

Brown, "Cold-Pressing . . .", J. Am. Ceramic Soc., Nov. 1972, vol. 55, No. 11, p. 541.
Nogami, "Dehydration of Gels. . . ", Dec. 1984, Comm. Am. Ceramic Soc., C-258.

*Primary Examiner*—John F. Terapane
*Assistant Examiner*—Catherine S. Kilby
*Attorney, Agent, or Firm*—Keil & Weinkauf

[57] ABSTRACT

A plastics mixture which absorbs electromagnetic radiation consists of a heat-stable thermoplastic polymer and from 1 to 90% by weight of a ferrite, titanate or zirconate having a particle size of from 100 to 5,000 Å. The mixture is prepared by combining the metal components in the form of organometallic compounds, mixing them with the thermoplastic, adding the amount of water required for hydrolysis and heating the mixture to about 250° C.

5 Claims, No Drawings

PROCESSES OF MAKING PLASTICS MIXTURES WHICH ABSORB ELECTROMAGNETIC RADIATION AND CONTAIN FERROELECTRIC AND/OR PIEZOELECTRIC SUBSTANCES

This application is a continuation of application Ser. No. 028,547, filed on Mar. 20, 1987 now abandoned.

Because of their easy deformability, their film-forming capacity, their low density and great toughness, organic polymers have a wide variety of applications. Important applications are for housings and coatings for housings, means of transportation and parts of buildings.

With the increased use of electronic functional components in all areas of industry, it has been found that these components are sensitive to external electromagnetic radiation. This is particularly so in the case of plastic housings.

For screening against troublesome electromagnetic effects, it has been proposed that the plastics and coatings used be provided with a high content of conductive carbon black or metal particles, such as copper powder or aluminum spangles, as fillers. However, the electrically conductive fillers have to be used in large amounts of from 10 to 50% by weight, which inevitably have a very adverse effect on the mechanical properties of the moldings and coatings, especially their toughness.

Other applications require absorption, instead of reflection, of electromagnetic radiation, this being particularly so in the case of the absorption of microwaves.

Known microwave absorbers are ferroelectric materials, i.e. ferrites of the type $MeO.Fe_2O_3$, where Me is Ni, Zn, Co, Cu, Cd, Mg, Ba, Sr or another metal ion. However, titanates or zirconates of the type $MeO.TiO_2$ and $MeO.ZrO_2$, respectively, where Me is Ba, La, Sr or Pb, also absorb electromagnetic radiation. It has also been disclosed that crystals of such ferrites, titanates and zirconates have preferred absorption frequencies (U.S. Pat. No. 4,023,174).

The frequency range of the absorption increases very sharply with decreasing primary particle size. Accordingly, the frequency range of microwave absorption is substantially broadened when the particle sizes are smaller than from 500–1,000 Å. Since the ferroelectricity vanishes below particle sizes of 100–200 Å the particle size range which is of interest in practice is from 100 to 5,000 Å preferably from 200 to 1,000 Å.

According to the prior art, the active ferroelectric and piezoelectric substances are prepared from the corresponding oxides by solid state reaction at above 1,000° C. and are then milled.

It is virtually impossible to obtain a finished mill base having particle sizes of less than 0.5–1 μm, corresponding to 5,000–10,000 Å. Moreover, in a mill base of this type there is a tendency to agglomeration of the particles initially produced, which is disadvantageous.

On the other hand, particles having a size of from 20 to 2,000 Å can readily be prepared by using sol-gel technology (Cold-Pressing and Low Temperature Sintering of Alkoxy-Derived PLZT, J. Am. Ceram. Soc. 55 (11) (1972), (541–4). In this procedure, organometallic compounds of the metals present in the ferrite are mixed in a stoichiometric ratio, hydrolyzed in a controlled manner and then crystallized at from 300° to 400° C. with crystallite growth.

The organometallic compounds include chelates, such as acetylacetonates, salts of carboxylic acids and hydroxycarboxylic acids, such as acetic acid, formic acid, benzoic acid, citric acid or tartaric acid, and preferably the metal alkoxides. The components are usually dissolved in polar organic solvents, such as methanol, ethanol, isopropanol, acetone, diisopropyl ether, methyl tert-butyl ether, tetrahydrofuran, ethylene glycol, diglycol, triglycol, dimethylformamide, N-methylformamide, N-cyclohexylpyrrolidone or chlorohydrocarbons. Hydrolysis is carried out by adding the stoichiometric amount of water. It can be accelerated by adding bases, such as ammonia or organic amines, e.g. methylamine, diethylamine tributylamine or tetramethylammonium hydroxide.

Although it has been found that ferroelectric particles can be produced in the required particle size range by sol-gel technology, these particles, when incorporated into plastic melts or polymer solutions, agglomerate to form large aggregates which are not very electrically effective and have an adverse effect on the mechanical properties.

It is an object of the present invention to provide plastics mixtures which absorb electromagnetic radiation and have sufficiently good mechanical properties. It is a further object of the present invention to provide an economical process for the preparation of such plastics mixtures.

We have found that these objects are achieved if from 1 to 90% by weight of a ferrite, titanate or zirconate is dispersed in from 99 to 10% by weight of a heat-stable plastic so that it has a particle size of from 100 to 5,000 Å and is present in non-agglomerated form.

This is done by combining the metal components of ferrite, titanate or zirconate in the form of organometallic compounds in stoichiometric ratios and mixing them with the thermoplastics, adding the amount of water required for hydrolysis and heating the mixture to above 250° C., preferably from 300° to 400°C.

The sol-gel process is preferably carried out in solution in a high boiling polar organic solvent. For this purpose, the organometallic components are dissolved in the solvent and mixed in the desired stoichiometric ratio, and the mixture is stirred at from 100° to 200° C. for from 1 to 3 hours. Exchange of the radicals bonded to the metals takes place, balancing out the rates of hydrolysis of the metal components.

Thereafter, the polymer is dissolved in this solution in the desired weight ratio. However, it is also possible to dissolve the polymers separately in the same solvent and then to mix the two solutions together.

The hydrolysis is then carried out by adding the stoichiometric amount of water, in the presence or absence of ammonia or an amine as an accelerator, below the boiling point of the solution and with vigorous stirring. In order to avoid flocculation of the resulting gel at the point of dropwise addition, the water is advantageosly diluted with an organic solvent, the solvent present in the reaction mixture preferably being used.

In the subsequent reaction step, the temperature is increased until solvent, and organic residues eliminated during hydrolysis are distilled off. This reaction is preferably carried out under reduced pressure in a stirred kettle or in another unit suitable for devolatilization, such as an extruder, a thin film evaporator or a filmtruder. The temperature is increased to above 250° C., preferably from 300° to 400° C., because temperatures in this range are necessary for the formation of the ferroelectric and/or piezoelectric particles and for their crystallization. The residence time in this temperature range is from 1 to 100, preferably from 3 to 15, minutes.

When removal of the solvent is complete, a granulatable melt is obtained. After extrusion, cooling, granulation and drying, the granules may be processed by the usual plastics processing methods, by means of injection molding, extrusion, blowmolding, deep drawing or spinning, to give moldings, profiles, films, hollow articles or fibers.

Preferably used organometallic components are metal alkoxides. These have the advantage that they possess a high metal content and their solubility can be adjusted within wide ranges by modifying the alkoxide radicals. Thus, the polarity increases sharply from the butoxide to the ethoxide and methoxide radicals.

It is also possible, in the reaction batch, to mix metal alkoxides with reactive metal oxides and hydroxides, in particular those of the metals Ba and Sr. Alcohol exchange results in the formulation of polynuclear alkoxides.

When metal alkoxides are used, solvents which contain hydroxyl groups are not very suitable since they react through alcohol exchange. Thus, when glycol, diethylene glycol or triethylene glycol is used, unstirrable gels are immediately formed. Preferred solvents are n-methylpyrrolidone, n-cyclohexylpyrrolidone, sulfolane, triphenyl phosphite, triphenyl phosphate and tricresyl-phosphate.

It is also possible to dispense with solvents entirely. A precondition for this is that the metal alkoxides dissolve in the relevant polymer melt or as solvents for the polymer at the reaction temperature. By varying the alkoxide radicals, the desired solubility can be obtained in a controlled manner. Mixing of the metal alkoxides with the polymer is preferably carried out in an extruder. The subsequent hydrolysis can be effected by forcing in steam in a downstream extruder zone.

Because of the high temperatures in the crystallization stage, the only suitable polymers are those which are correspondingly heat-stable, e.g. nylon 6, polysulfones, polyether sulfones, polyamidoimides, aromatic polyetherimides, aromatic polyether ketones or aromatic polyesters.

The amount of ferroelectric and/or piezoelectric particles in the plastics blend is from 1 to 90, preferably from 2 to 60, % by weight.

The mixture according to the invention can be used as a component in blends with other polymers or as an active component in coatings.

EXAMPLE 1

123.7 g of nickel isopropoxide, 55.0 g of zinc isopropoxide and 466 g of iron(III) isopropoxide are dissolved in 1,000 g of n-methylpyrrolidone, and the mixture is kept at 120° C. for 2 hours.

In a second container, 556 g of a polysulfone based on bisphenol A and 4,4'-dichlorodiphenyl sulfone and having a relative viscosity of 1.57, measured on a 1% strength solution in N-methylpyrrolidone at 25° C., are dissolved in 1,000 g of N-methylpyrrolidone at 120° C. in the course of about 3 hours, while stirring.

The mixture of the alkoxides is then added to the polymer solution, and this mixture is heated to 170° C., while stirring. A solution of 144 g of water in 500 g of N-methylpyrrolidone is run in over a period of about 1 hour at from 170° to 180° C., while stirring vigorously.

During this procedure, about 400 g of isopropanol distil off (theory: 480 g). The temperature is then increased to about 260° C., and about 400 g of N-methylpyrrolidone and the remaining isopropanol and water are distilled off.

The remaining hot viscous solution is pumped into a laboratory extruder, the solution being fed to the middle zone of the barrel and the solvent being removed at the extruder entrance by means of a vacuum pump under about 20 mbar. The extruder is heated to 360° C. With a throughput of about 1 kg of solution per hour and a residence time of about 20 minutes, the melt reaches virtually this temperature.

The polymer extrudate is removed at the extruder exit, passed through a waterbath and granulated.

The resulting polysulfone mixture contains about 30% by weight of a ferrite of the empirical formula $Ni_{0.7}Zn_{0.3}Fe_2O_4$; the particle sizes are predominantly in the range from 400 to 800 Å.

EXAMPLE 2

255 g of barium isopropoxide and 340 g of titanium tetrabutoxide are dissolved in 1,200 g of N-cyclohexylpyrrolidone, similarly to Example 1, and the solution is kept at 150° C. for 2 hours.

In a second container, 1,700 g of a polyether sulfone based on 4,4'-dichlorodiphenyl sulfone and 4,4'-dihydroxydiphenyl sulfone and having a relative viscosity of 1.53, measured on a 1% strength solution in N-methylpyrrolidone at 25° C., are dissolved in 3,000 g of N-cyclohexylpyrrolidone at 150° C. in the course of about 3 hours.

The mixture of the alkoxides is added to the polymer solution, and this mixture is then heated to 170° C., while stirring. A mixture of 110 g of water and 400 g of N-cyclohexylpyrrolidone is then run in over a period of about 1 hour at from 170° to 180° C., while stirring vigorously. About 380 g of alcohols (theory: 416 g) distil off during this procedure.

After the temperature has been increased to about 330° C., about 2,000 g of N-cyclohexylpyrrolidone, the remaining alcohol and water are distilled off.

The viscous solution is devolatilized by being pumped into a laboratory extruder, as described in Example 1. The extruder is heated to 390° C. A throughput of about 1 kg of solution per hour and a mean residence time of about 15 minutes are used, and a polymer extrudate is taken off at the end of the extruder, passed through a waterbath and granulated.

The resulting polyether sulfone mixture contains about 12% by weight of barium titanate of the empirical formula $BaTiO_3$, having non-agglomerated particles predominantly from 200 to 600 Å in size.

EXAMPLE 3

The experimental conditions are similar to those of Example 2. 343 g of lead isoamylate, 245 g of zirconium tetrabutoxide, 116 g of titanium tetrabutoxide and 32 g of lanthanum isopropoxide are dissolved in 1,500 g of N-cyclohexylpyrrolidone, and the solution is kept at 150° C. for 2 hours.

In a second container, 325 g of polyethersulfone (as in Example 2) are dissolved in 700 g of N-cyclohexylpyrrolidone.

The mixture of the alkoxides is added to the polymer solution, and the resulting mixture is heated to 170° C. A mixture of 110 g of water and 400 g of N-cyclohexylpyrrolidone is run in over a period of about 1 hour, while stirring vigorously. About 430 g of alcohols (theory: 467 g) are distilled off during this procedure.

After the temperature has been increased to about 330° C., about 1,000 g of N-cyclohexylpyrrolidone, the remaining alcohol and water are distilled off.

Working up by means of an extruder as described in Example 2 gives a polyether sulfone which contains about 50% by weight of a lead lanthanum zirconate titanate ceramic (PLZT) having the composition $Pb_{0.9}La_{0.1}(Zr_{0.64}-Ti_{0.34})O_3$, the particle size being from 500 to 1,500 Å.

We claim:

1. A process for the preparation of a plastics mixture which absorbs electromagnetic radiation, and which contains:
   (A) from 99 to 10% by weight of a heat-stable thermoplastic polymer, and
   (B) from 1 to 90% by weight of a ferrite of the formula $MeO.Fe_2O_3$, a titanate of the formula $MeTiO_3$, a zirconate of the formula $MeZrO_3$ or a mixed compound of the formula $Me'_m Me''_n (Ti_x Zr_y)O_3$ where $x+y=1$, $m+n=1$ and Me' and Me'' are divalent metal cations, wherein said ferrite, titanate, zirconate or mixed compound has a particle size of from 100 to 5,000Å and is present in a nonagglomerated form dispersed in said thermoplastic polymer, which process comprises: combining metal components necessary to form said ferrite, titanate, zirconate or mixed compound and in the stoichiometric ratios required to form said ferrite, titanate, zirconate or mixed compound, in the form of organometallic compounds; and mixing said metal components in their organometallic form with the thermoplastic polymer and the amount of water required for hydrolysis; and heating the mixture to above 250° C.

2. The process of claim 1, wherein mixing of the components and hydrolysis are carried out in a high boiling polar organic solvent.

3. The process of claim 1, wherein the mixture is heated to 300° to 400° C.

4. The process of claim 1, wherein said metal components in their organometallic form are prepared by mixing the appropriate metal alkoxides with reactive metal oxides and/or hydroxides of divalent metal cations.

5. The process of claim 1, wherein said divalent metal cations are Ba and Sr.

* * * * *